United States Patent [19]

Kasugai

[11] Patent Number: 4,780,715
[45] Date of Patent: Oct. 25, 1988

[54] COMMUNICATION SYSTEM CAPABLE OF INTERRUPTION TALK DURING DATA TRANSMISSION

[75] Inventor: Teruaki Kasugai, Tokyo, Japan
[73] Assignee: NEC Corporation, Japan
[21] Appl. No.: 68,785
[22] Filed: Jun. 25, 1987

Related U.S. Application Data

[63] Continuation-in-part of Ser. No. 819,700, Jan. 16, 1986, abandoned.

[30] Foreign Application Priority Data

Jan. 25, 1985 [JP] Japan .................................. 60-10989

[51] Int. Cl.$^4$ ......................... H04Q 7/00; H04B 1/00
[52] U.S. Cl. ............................... 340/825.080; 455/54; 455/58
[58] Field of Search .................... 340/825.08, 825.07, 340/825.44, 825.48, 825.5; 455/54, 57, 58, 38, 70; 379/63

[56] References Cited

U.S. PATENT DOCUMENTS

| | | | |
|---|---|---|---|
| 4,131,849 | 12/1978 | Freeburg et al. | 455/58 |
| 4,430,742 | 2/1984 | Milleker et al. | 455/38 |
| 4,477,809 | 10/1984 | Bose | 455/54 |
| 4,517,561 | 5/1985 | Burke et al. | 455/58 |
| 4,553,263 | 11/1985 | Smith et al. | 340/825.5 |
| 4,554,677 | 11/1985 | Smith et al. | 455/58 |
| 4,573,207 | 2/1986 | Smith et al. | 455/58 |

Primary Examiner—Donald J. Yusko
Attorney, Agent, or Firm—Laff, Whitesel, Conte & Saret

[57] ABSTRACT

A communication system may perform talking and data transmission by a polling process which are carried out between a plurality of terminal units and a central control station. The system is capable of interruption talk during data transmission. The central control station is provided with time slots for use in interruption, which is given at appropriate time intervals in the polling process. Thus, until the predetermined polling is finished, the central control station repeats the steps of (i) generating interruption acceptance signals at appropriate intervals in the polling mode, (ii) thereafter giving a plurality of time slots for receiving the interruption signals from the terminal units, and (iii) when interruption signals from the terminal units are received in the plurality of time slots, returning to the talk mode by generating a polling finish signal and terminating the polling or by simply terminating the polling. When interruption signals are not received, the polling is continued. The terminal units may demand to switch to talking while in the polling mode. A plurality of slots are independently timed with the central control station after receiving the interruption acceptance signal from the central station. The terminal unit selects a random one of the slots and sends an interruption signal through such slot. Thus, the talk and the data transmission by the polling process are realized in the same channel.

4 Claims, 5 Drawing Sheets

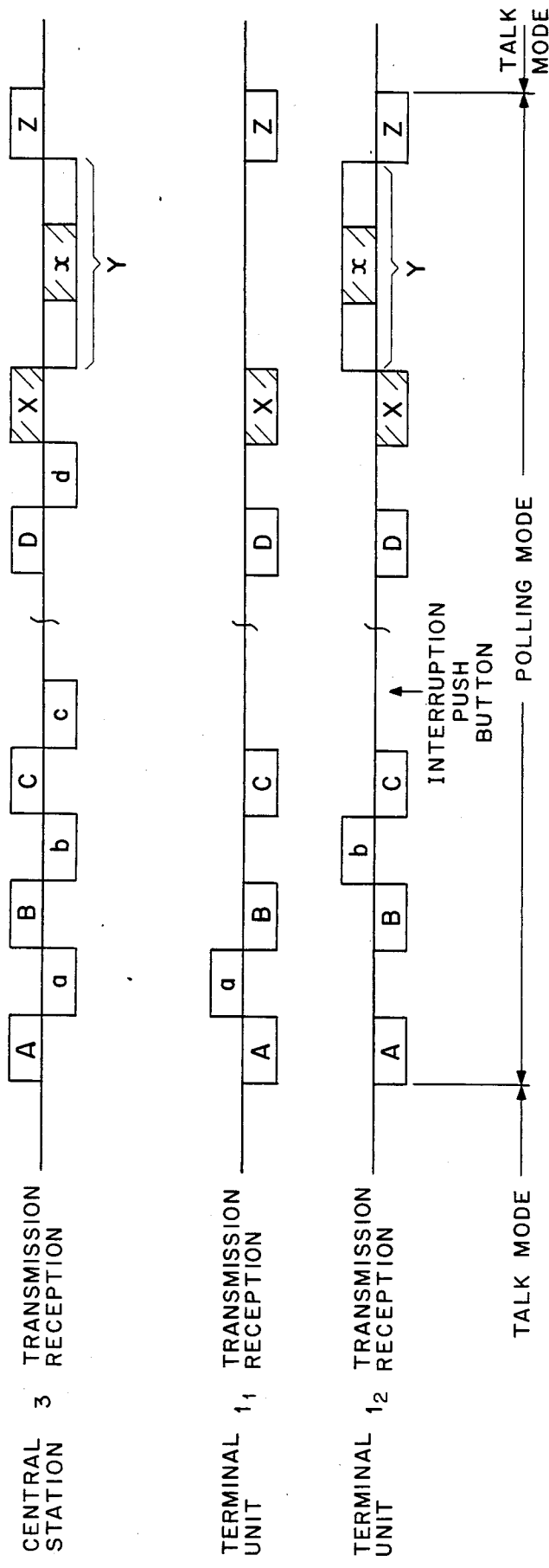

COMMUNICATION SYSTEM CAPABLE OF INTERRUPTION TALK DURING DATA TRANSMISSION

This is a continuation-in-part of Ser. No. 06/819,700, filed Jan. 16, 1986, abandoned.

BACKGROUND OF THE INVENTION

1. Field of the Invention

The present invention relates to a communication system which is capable of interruption talk during data transmission, and, more particularly, to a radio communication system which is capable of interruption talk during data transmission, by polling between a fixed central station and a plurality of mobile terminal units.

2. Description of the Prior Art

A conventional radio communication system of this kind comprises a central station and a plurality of terminal units, such as mobile units. The central station sends digital polling signals to the terminal units and receives response data signals from the terminal units, respectively.

During the time when data transmission is performed by a polling operation, etc, it has been inhibited to make a free talk from terminal units in order to avoid any data destruction by collision. This has caused inconveniences, such as an impossibility of talk even in an emergency, or the like.

SUMMARY OF THE INVENTION

The purpose of the present invention is, therefore, to provide a new communication system that is capable of realizing an interruption talk even during polling operation.

As described above, the present invention provides a communication system comprising a central control station, and a plurality of terminal units linked thereto.

The central control station generates a sequence of digital signals comprising a plurality of polling signals and at least one interruption acceptance signal. The interruption signal is inserted into the polling signals at a time interval which is followed by a plurality of empty time slots.

The system sends digital signals to the terminal units.

The terminal units receive the digital signals and sends to the central control station a response signal corresponding to each of the polling signals.

An interruption signal is sent in response to a control signal, after the reception of the interruption acceptance signal.

The central control station sends a polling completion signal, in response to the reception of the interruption signal, within the empty time slots, to the terminal units.

Each of the terminal units receives the polling completion signal, whereby the terminal unit sending the interruption signal talks with the central station.

DESCRIPTION OF THE DRAWINGS

The present invention will hereinafter be explained with reference to the accompanying drawings, wherein:

FIGS. 5 and 6 respectively show examples of timing charts of the central control station and of the system;

FIG. 7 shows an example of a signal format and

FIG. 8 shows additional details of the block diagram of the equipment at the terminal units and at the central station shown in FIG. 2.

EMBODIMENTS

Figure 1:
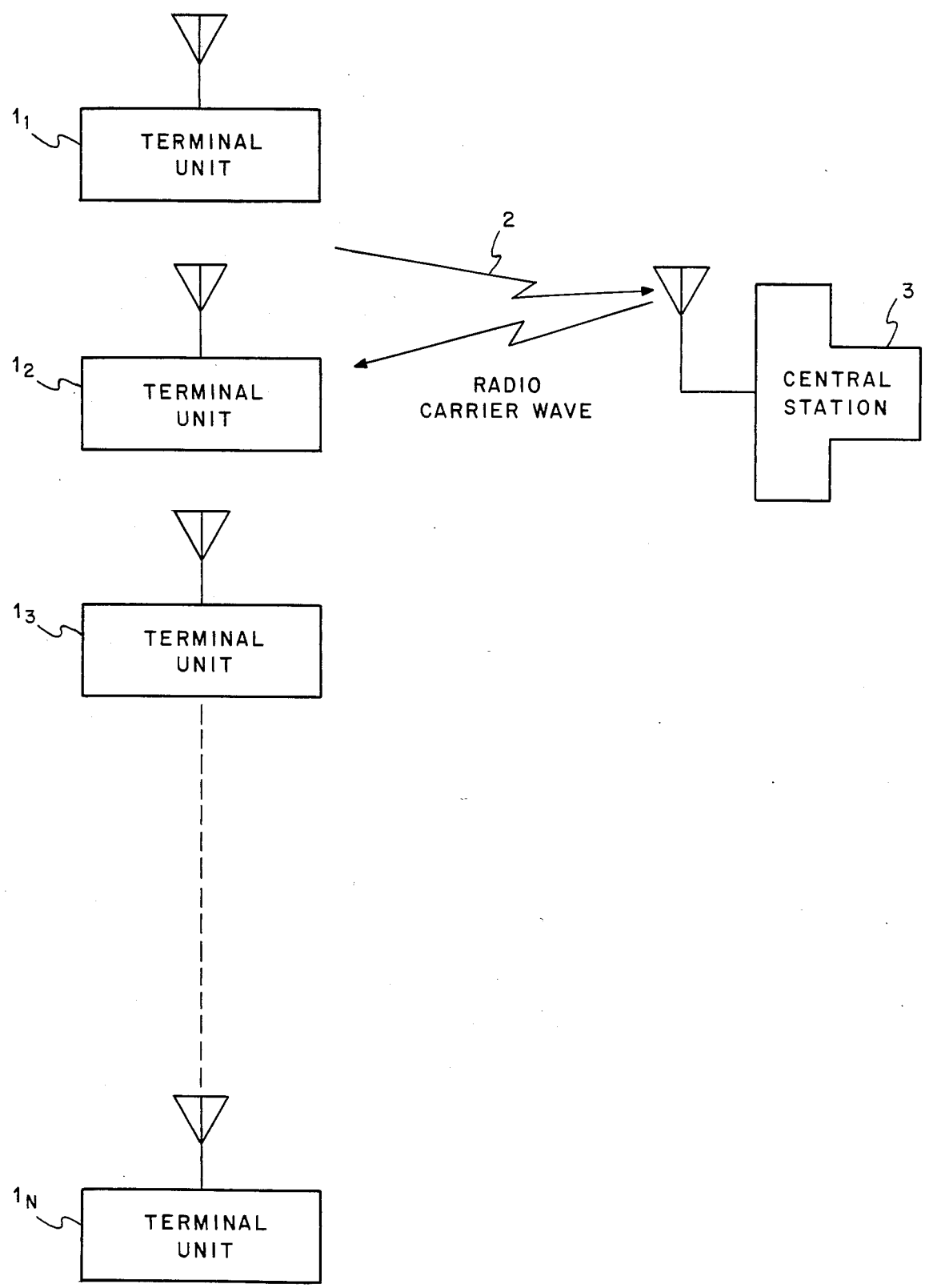
FIG. 1 illustrates a block diagram of a radio communication system including a central control station and a plurality of terminal units or stations, to which the present invention is applicable.

FIG. 1 shows a radio communication system to which the present invention is applicable. The terminal units $1_1, 1_2, 1_3, \ldots 1_N$ are linked to the central control station 3 by a pair of radio carrier channels 2. The radio carrier channels 2, in this case, may be replaced by a single channel carrier wave. Further, the communication system in this case may be either full or half duplex. Moreover, the terminal units may be either fixed or mobile. The terminal units may be linked to the central control station by transmission wires, respectively.

Figure 2:
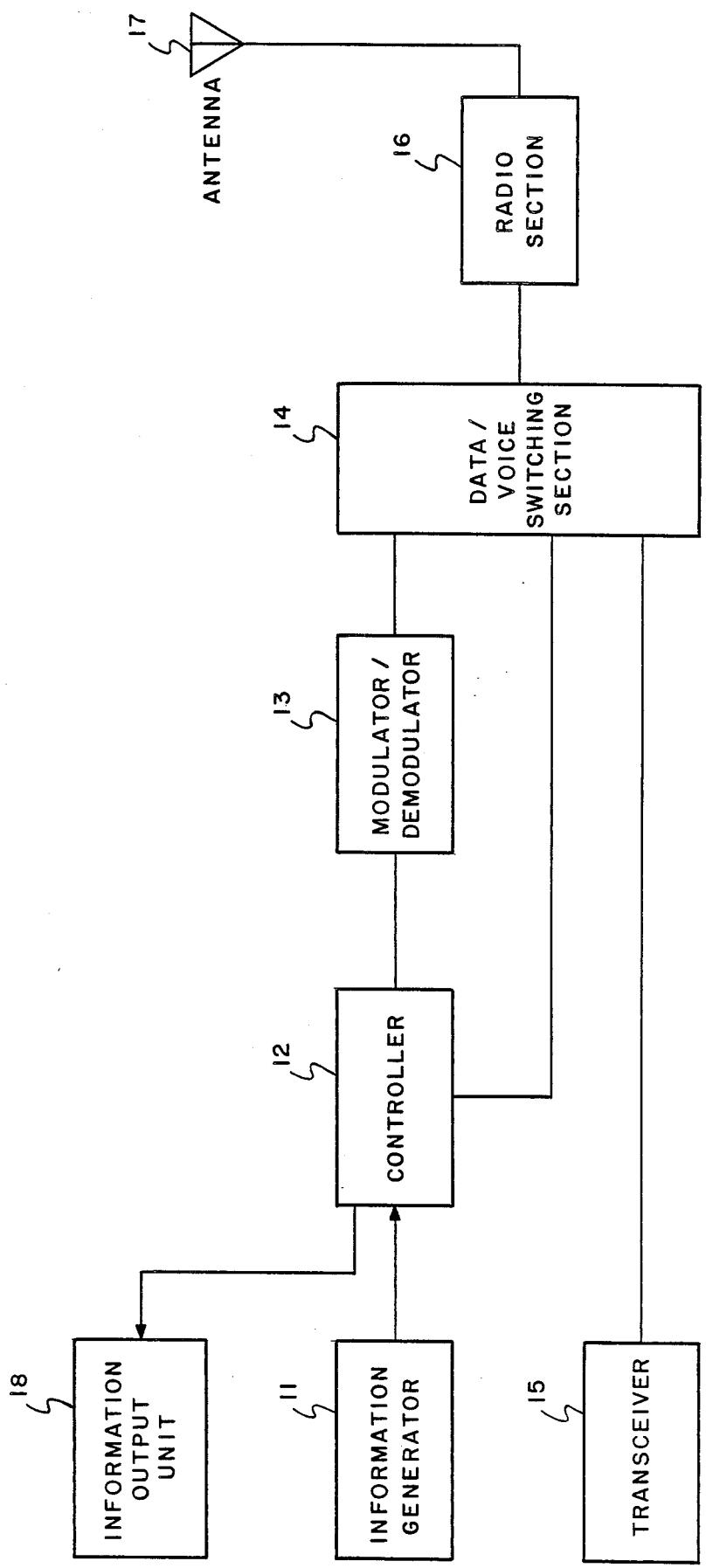
FIG. 2 is a block diagram of any one of the terminal units and the central control station of the present invention.

FIG. 2 shows a block diagram of the equipment of the terminal units and of the central control station, shown in FIG. 1, in a style which is common to the terminal units and the central control station. The information data generated from an information generator 11 comprising keys, sensors, etc. are processed by a controller 12, converted to baseband signals, for example, FSK signals or PSK signals by a modulator/demodulator 13, and are supplied to a data/voice switching section 14. The controller 12 controls the data/voice switching section 14 to control the transmission and reception of the data and, or voice, as described hereinafter.

A tranceiver 15 is also connected to the data/voice switching section 14. In the case of a half duplex communication system, or the like, a transmission start signal may be sent from the transceiver 15 to the controller 12. The signal selected by the data/voice switching section 14 is converted into a radio modulated carrier wave within a radio section 16 and is transmitted to a remote unit or station through an antenna 17.

On the other hand, the signal from a remote unit or station is received by the antenna 17, demodulated into the baseband signal by the radio section 16 and supplied to the data/voice switching section 14. The data signals are demodulated in the modulator/demodulator 13 and are sent to the controller 12. The controller 12 then controls the data/voice switching section 14 under the conditions also explained hereinafter so that in the case of voice, a connection is made to the tranceiver 15, and in the case of data, decoding is made by the controller 12, which sends its outputs to an information output means 18 comprising a display, a printer, etc. In this connection, it is to be noted that although FIG. 2 shows an embodiment employing a subcarrier modulation system, similar results can be obtained by employing a direct modulation system to effect the direct modulation into the radio carrier waves responsive to the data.

Figure 3:
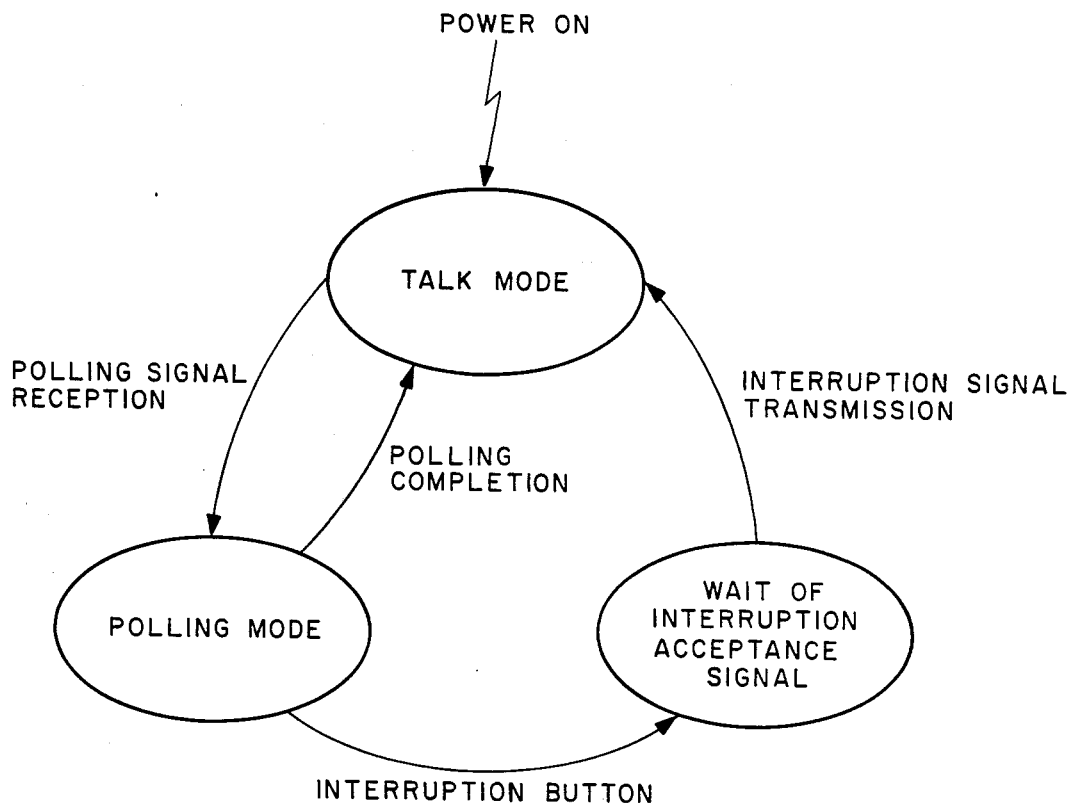
FIG. 3 illustrates a state transition diagram of the terminal units according to the present invention.

FIG. 3 illustrates a state transition diagram at the terminal units. First, a "power on" operation enables the start of a talk mode. In this talk mode, the transmission of either voice or data can be freely made. Usually, the operation is made in this talk mode. Upon receipt of a polling signal from the central station, the state moves to a polling mode. The meaning of the term "polling signal" used herein, is not limited to only the polling signal addressed to one specific terminal unit, but also covers all of the polling signals carried by the same channel. In the example of the below-mentioned signal format, all the signals have a polling command as their commands.

In the polling mode, all free transmission of voice and data is inhibited, but only during the polling addressed to one specific terminal unit can its own data be transmitted. This priority is provided to avoid any destruction of data by collision. The release of the polling mode usually is effected in either of two ways, one is the reception of a polling completion signal from the central control station, and the other is a time out, that is, the absence of the polling signal within a predetermined period of time.

According to the present invention, a compulsory release function of the polling mode is specifically provided for any interruption talk. Namely, by pushing an interruption button or by generating a control signal, the state goes to a wait for interruption acceptance signal condition. It is arranged so that, even in this state, a usual polling function is maintained. Upon the receipt of an interruption acceptance signal from the central control station, an interruption signal is transmitted and the state returns to the talk mode.

Figure 4:
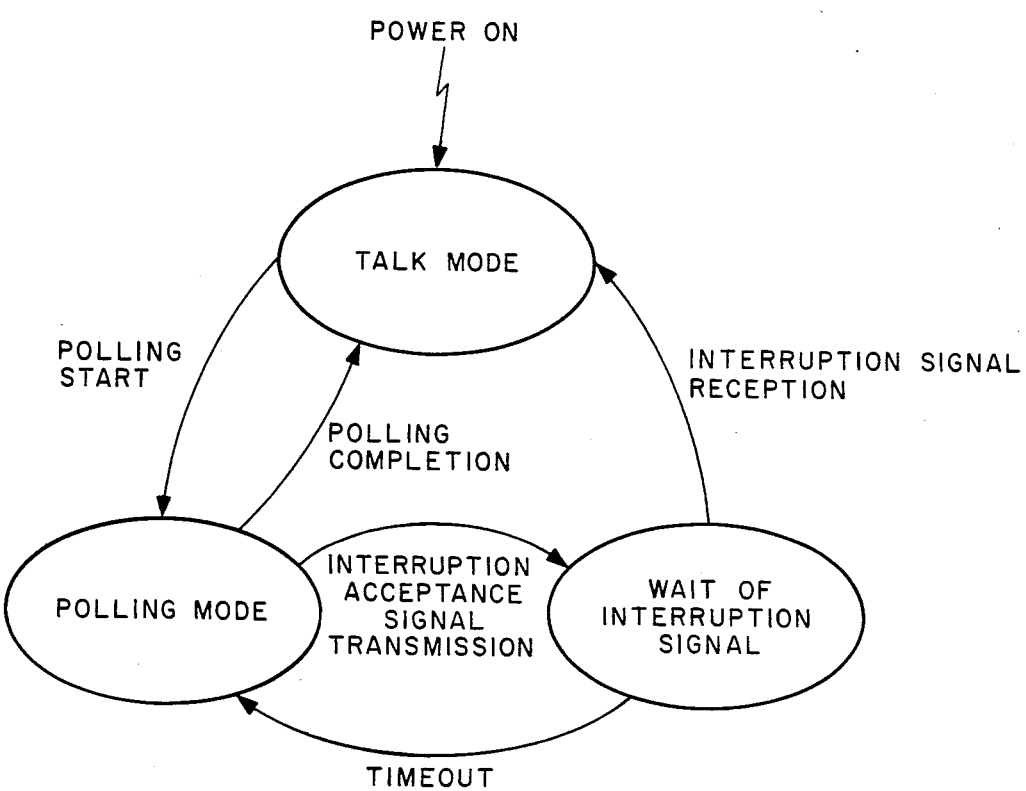
FIG. 4 illustrates a state transition diagram of the central station according to the present invention.

FIG. 4 illustrates a state of transition diagram at the central control station. Similarly to the terminal units, a "power on" operation permits the start of a talk mode and usually the operation proceeds in this mode. In the talk mode, free talking is possible. When the data from terminal units are received, a response signal is sent back.

The transition to a polling mode is manually started or automatically started by means of a timer, etc. In the polling mode, the polling of the terminal units is carried out sequentially. During such a polling operation, interruption acceptance signals are transmitted to the terminal units at fixed or unfixed time intervals. The state moves to the wait for interruption signals from the terminal units. In the "wait for interruption signals" state, any reception of interruption signals within a predetermined period of time causes a transmission of a polling completion signal, or the like, to return to the talk mode. However, if no interruption signals are received within the time period, the state returns to the polling mode and the polling continues. Upon completion of the polling of a necessary number of the terminal units, the state returns to the talk mode. At such time, a polling completion signal may be either generated or not generated.

Figure 5:
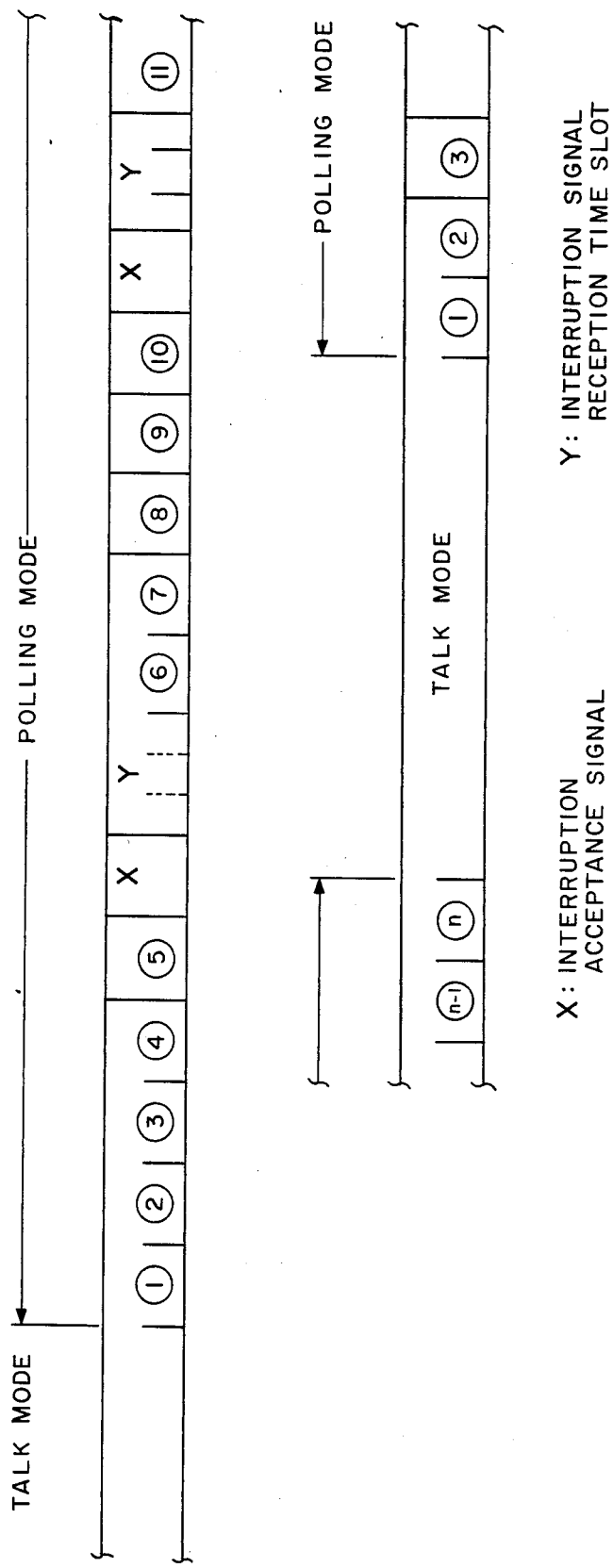

FIG. 5 shows an example of a timing chart of the central control station. As soon as the polling is started, the terminal units are sequentially polled. In this example, five terminal units are polled. At the time of the completion of the polling of the terminal units, an interruption acceptance signal X is transmitted. Subsequently, interruption signal reception time slots (or empty time slots) Y are given. A plurality of these time slots are given for reducing any collision of signals when two or more terminal units request interrupts at the same time. By a random selection of these time slots, such a reduction of collisions can be made. Upon the finish of the interruption time slots, the polling of the following units is started. Thus, after a completion of the polling of all the units, the state returns to the talk mode.

If there are a plurality of interruption signals which are received from a plurality of terminal units within the plurality of time slots designated for receiving such signals in the central control station, one of the following processings may be made:

(1) The central control station accepts only the earliest interruption signal, that is, the interruption signal received in the earliest time slot. Then the central control station initiates the interruption processing for the terminal that has sent the earliest interruption signal. The central control station does not send a response signal to the terminals that have sent later interruption signals. The unanswered terminals detect the absence of such response signal within a predetermined period of time after their having sent the interruption signal and then they resend their interruption signals.

(2) The central control station accepts a plurality of interruption signals in the order of reception time. To the terminal which sent the earliest interruption signal, the central control station sends a response signal to intiate the the interruption processing. To the later terminals, the central control station sends a recognition of reception signals which places them on a stand-by under waiting condition. After a completion of the interruption processing of the earliest or of an earlier terminal, the central control station successively initiates the interruption processing of the standing-by terminals.

(3) If a plurality of interruption signals are received in the same time slot the central control station rejects all of them as an abnormal collision. The central control station does not send any response signals to the terminals that have sent the interrruption signals which collided. The unanswered terminals detect the absence of the response signal from the central control station within a predetermined period of time after their having sent the interruption signals. Then, the unanswered terminals resend their interruption signals, at random intervals.

FIG. 6 shows an example of a timing chart of the system, wherein an interruption is made. As mentioned herebefore, usually the state stands in a talk mode. Referring also to FIG. 1, upon the start of the polling, polling signals are transmitted from the central control station 3, as shown by signals A through C in FIG. 6. In response thereto, the necessary data are transmitted from the terminal units $1_1$ and $1_2$, as responsive to signals a through c.

Now, it is assumed that an interruption button is pushed in the terminal unit $1_2$ (FIG. 1). Then, the state goes to the wait for an interruption acceptance signal from the central control station 3. The central control station 3 discontinues the polling after an appropriate time interval and transmits an interruption acceptance signal X (FIG. 6) and, further, continuously gives an appropriate number of interruption signal reception time slots Y. After receiving the interruption acceptance signal X, the terminal unit $1_2$ selects, at random, one of the interruption signal reception time slots Y and transmits an interruption signal X.

Upon receipt of the interruption signal x in the time slots Y, the central control station 3 transmits a polling completion signal z and returns to the talk mode. Then, the terminal unit returns to the talk mode in response to this polling completion signal. In this connection, it is also possible to employ means for returning to the talk mode by the termination of the polling in the central control station, and to the time out in the terminal unit without generating the polling completion signal. In the case wherein an urgent operation is required, however, this example is more suitable.

FIG. 7 shows an example of a signal format. In this FIG. 7, a bit synchronization signal is a preamble for stabilizing the system. The frame synchronization signal indicates a head or start of the frame and indicates that the data will follow thereafter. The data portion is constituted by various informations. Its command portion discriminates between the polling signals, response signals, interruption acceptance signals, interruption signals, polling completion signals, etc. The individual numbers to follow are the identification numbers which are to be alloted to the terminal units and to the central control station. The data portion is also constituted by other various information.

As described above, the present invention provides a communication system which is capable of interruption talk during data transmission by a polling process between terminal units and a central control station.

The central control station has the functions of:
(a) usually, in a talk mode, talking with the terminal units;
(b) when manually or automatically changed to a polling mode, effecting data collection by sequentially and continuously polling against at least a part of the terminal units and, when finished, returning to the talk mode by generating a polling completion signal or simply terminating the polling; and
(c) until the predetermined polling is finished, repeating the steps of (i) generating interruption acceptance signals at appropriate intervals in the polling mode, (ii) giving thereafter a plurality of time slots for receiving the interruption signals from the terminal units, and (iii) when interruption signals from the terminal units are received in the plurality of time slots, returning to the talk mode by generating a polling finish signal and by terminating the polling or by simply terminating the polling. When the interruption signals are not received, the polling is continued.

The plurality of terminal units have the functions of:
(a) usually, in a talk mode, talking with the central control station or with other terminal units by either a simplex or duplex operation;
(b) changing to a polling mode upon the receipt of a polling start signal or a polling signal from the central control station, inhibiting the talking in the polling mode. When a polling signal directed to a particular terminal unit is received, it sends its own messages;
(c) when an occasion demands talking in the polling mode, either a manual or automatic command signal may be sent. Assuming that there are a plurality of idle and available time slots with the central control station, after receiving the interruption acceptance signal from the central control station, a random one of the idle slots is elected for sending an interruption signal through such slot; and
(d) the polling mode is released to the talk mode either when a polling finish signal is received or when a polling signal is not received within a predetermined time interval.

Thus, the talk and the data transmission by polling process are realized in the same channel.

As is understood from the above explanation, the interruption talk system of the present invention enables an interruption of talk even during the polling. Namely, it enables a realization of the data transmission in response to the polling process in a channel while it is in the talking mode.

An example of the operation of the central control station will be explained with reference to FIG. 8. In the talk mode, usually an RF modulator switch (MOD SW) 30 is shifted to a microphone amplifier (MIC AMP) 34 and a speaker switch (SPK SW) 31 is turned "on", under the control of a one-chip CPU 26.

When the press-to-talk switch (PRS) 42 is pressed "on", the CPU 26 responds, and acting through the transmitter control line (TX CONT LINE) 43, turns on an RF transmitter (TX) 37, turns off an RF receiver (RX) 36, and shifts an antenna switch (ANT SW) 38 to connect transmitter TX 37 to the antenna. In this transmission state, the voice signals from microphone (MIC) 40 are transmitted as voice-modulated RF carrier signals from an antenna (ANT) 39. The circuit may be traced through MIC AMP 34, MOD SW 30, and RF modulator buffer (MOD BUF) 33, transmitter TX 37, and ANT SW 38.

When the press-to-talk PRS 42 is released, ANT SW 38 is shifted to receiver RX 36, demodulator buffer 32, and speaker switch SPK SW 31 are turned on. Transmitter TX 37 is turned off and MOD SW 30 is shifted from microphone amplifier MIC AMP 34, responsive to the control by CPU 26. In this receiving state, RF carrier signals received at ANT 39 are input through ANT SW 38 to receiver RX 36 and demodulated therein to voice signals. The voice signals are then transmitted through an RF demodulator buffer (DEM BUF) 32, speaker switch SPK SW 31, and a speaker amplifier (SPK AMP) 35 to drive a speaker (SPK) 41.

The polling mode is started by a key operation at keyboard (KEY BOARD) 24. Then, the CPU 26 switches MOD SW 30 to a modulator-demodulator (MODEM) 29 and switches off the speaker switch SPK SW 31.

The CPU 26 then changes various circuits to the transmission state by sending signals over TX CONT LINE 43. The circuit reaction is similar to the reaction in the above-described voice transmission state. A polling signal is sent to the first terminal unit which is identified in the address store 27. This signal is modulated by MODEM 29 to become a FSK signal, PSK signal, etc. which is then transmitted as an RF carrier signal through MOD SW 30, MOD BUFF 33, TX 37, ANT SW 38, and ANT 39.

Upon completion of the transmission of the polling signal, the CPU 26 sends signals over TX CONT LINE 43. The circuit changes from the transmission state to the receiving state, which is similar to the voice receiving state. The circuit now waits for a response signal from the terminal unit.

The response signal from the terminal unit is received at ANT 39, input through antenna switch ANT SW 38 to receiver RX 36. Then, it is converted in receiver RX to an FSK signal, PSK signal, etc., and is input through DEM BUF 32 to MODEM 29, which converts them into logic signals, which are input to CPU 26. The CPU 26 then decodes the response signal from the terminal unit and shows the results on a display (DISP) 21. The display is controlled by a display controller (DISP CONT) 23 and a driver (DRIV) 22.

The circuit may repeat the above-described polling for any appropriate number of terminal units, in turn. The CPU 26 transmits an interruption acceptance signal to the terminal units in a manner which is similar to the transmission of the polling signals, but without specifically addressing any one of the terminal units.

The CPU 26 waits for any interruption signal from any one or more of the terminal unit by placing itself in a receiving state which is similar to the above operations. The time slots for receiving such an interruption signal are long enough to receive a plurality of interruption signals. If no interruption signals are received in such time slots, the polling of other terminal units is started.

If any interruption signal is detected by CPU 26 within the appropriate time slots, it acts through TX CONT LINE 43 to change various circuits from the receiving state to the transmission state and transmits a polling completion signal through MODEM 29, MOD SW 30, MOD BUF 33, TX 37, ANT SW 38, and antenna ANT 39. After the transmission of the polling completion signal, CPU 26 marks TX CONT LINE 43 to change from the transmission state to the receiving state, shifts MOD SW 30 to MIC AMP 34, and turns on SPK SW 31. These changes switch the circuit from the polling mode to the talk mode. Further, CPU 26 indicates the generation of the interruption through DISP CONT 23, DRIV 22 and DISP 21 and sounds a buzzer (BZ) 44.

Next, to be explained is an example of the operation of the terminal unit, also with reference to FIG. 8. In the talk mode, the states of the circuits are the same in both the terminal unit and the central control station. When a polling signal from the central control station is received by the terminal circuit, while it is in the talk mode, the polling is detected by CPU 26 through ANT 39, ANT SW 38, RX 36, DEM BUF 32, and MODEM 29. The MOD SW 30 is shifted to MODEM 29 and the SPK SW 31 is turned off to enter the polling mode. This entrance into the polling mode is indicated by display DISP 21 in response to signals sent through DISP CONT 23 and DRIV 22. Also buzzer BZ 44 sounds.

A series of successive polling signals may be received. When a specific polling signal is received which includes an address corresponding to the address of this particular terminal unit, it is detected by an address switch (ADDR) 27. A response signal is then transmitted through CPU 26, MODEM 29, MOD SW 30, MOD BUF 33, TX 37, ANT SW 38 and ANT 39 to the central control station in response to a changing in the state of the TX CONT LINE 43. The response signal includes the data previously entered by KEY BOARD 24. The data obtained by a sensor (SENS) 45 and the address of the terminal unit are set by its own ADDR 27.

If the KEY BOARD 24 is operated, an interruption is requested in this polling mode. The CPU 26 stores such request and awaits for a reception of an interruption acceptance signal to follow from the central control station. The central control station periodically transmits the interruption acceptance signal during a polling mode. As soon as such an interruption acceptance signal is received, the CPU 26 of the terminal unit selects at random one of the plurality of time slots. The time slots are controlled by the CPU 26 itself and are started from the time of the receiving of the interruption acceptance signal.

The terminal unit transmits an interruption signal to the central control station in a manner which is similar to the above mentioned response signal, but reception is in the selected time slot. The CPU 26 then changes from the transmission state to the receiving state and awaits a polling completion signal from the central control station.

As soon as the polling completion signal is received, the CPU 26 shifts MOD SW 30 to MIC AMP 34 and turns on SPK SW 31 to return to the talk mode. This change of mode is indicated by DISP 21 and also by the buzzer 44. In this state, interruption talk becomes possible.

The polling mode of the terminal unit is released when the polling completion signal is received, or when a polling signal has not been received for a predetermined period of time.

Those who are skilled in the art will readily perceive how to modify the invention. Therefore, the appended claims are to be construed to cover all equivalent structures which fall within the true scope and spirit of the invention.

What is claimed is:

1. A communication system comprising a central control station, and a plurality of terminal units linked thereto, (a) said central control station comprising:
   means for generating a sequence of digital signals comprising a plurality of polling signals and at least one interruption acceptance signal, said interruption acceptance signal being inserted into said polling signals at a time interval and being followed by a plurality of empty time slots;
   means for sending said digital signals to said terminal units;

(b) each of said terminal units comprising:
   means for receiving said digital signals;
   means for sending to said central control station a response signal corresponding to each of said polling signals;
   means responsive to a control signal for sending an interruption signal after the reception of said interruption acceptance signal;

(c) said central control station further comprising means for sending to said terminal units a polling completion signal in response to the reception of said interruption signal within said empty time slots;

(d) each of said terminal units further comprising means for receiving said polling completion signal, whereby the terminal unit sending said interruption signal talks with said central control station.

2. A communication control system capable of interruption talk during data transmission by a polling process between terminal units and a central control station, wherein said central control station comprises:

(a) means responsive to said central control station being switched to a talk mode for enabling it to talk with the terminal units by a simplex or duplex operation, (b) means responsive to said central control station being switched to a polling mode for effecting data collection by sequentially and continuously polling against at least part of the terminal units and, when said polling is finished for returning to the talk mode terminating the polling, and (c) means for continuing until the predetermined polling is finished, repeating the steps of (i) generating interruption acceptance signals at appropriate intervals in the polling mode, (ii) thereafter giving a plurality of time slots for receiving the interruption signals from the terminal units, and (iii) returning to the talk mode by generating a polling finish signal and terminating the polling or by simply terminating the polling responsive to interruption signals from the terminal units which are received in the plurality of time slots, whereby the talk and the data transmission by polling process are realized in the same channel.

3. A communication control system capable of interruption talk during data transmission by polling process between terminal units and a central control station, wherein said plural terminal units comprise:

(a) means responsive to said terminal being switched to a talk mode for talking with the central control station or other terminal units by a simplex or duplex operation;

(b) means for switching to a polling mode upon receipt of a polling signal from the central control station for inhibiting talking while in the polling mode and means responsive to a terminal unit receiving its own polling signal for sending its own messages;

(c) means responsive to a demand for talking while said terminal unit is in the polling mode for assuming a plurality of slots timed with the central control station independently after receiving an interruption acceptance signal from the central control station, means for selecting one of the slots at random and for sending an interruption signal through said selected slot; and (d) means for switching the polling mode to the talk mode responsive either to the receipt of a polling finish signal or to a failure to receive a polling signal within a predetermined time interval; whereby the talk and the data transmission by a polling process are realized in the same channel.

4. A method of operating a communication control system which is capable of interrupting talk during data transmission in response to a polling process between terminal units and a central station, wherein:

(1) said central station operates in the following steps:

(a) talking with the terminal units by simplex or duplex operation while said system is in a talk mode;

(b) changing said system to a polling mode, collecting data by sequentially and continuously polling against at least some of the terminal units, and returning to the talk mode when said polling is finished responsive to a termination of the polling; and (c) repeating until the predetermined polling is finished the steps of (i) generating interruption acceptance signals at appropriate intervals in the polling mode, (ii) thereafter giving a plurality of interruption slots for receiving interruption signals from the terminal units, and (iii) responding to interruption signals from the terminal units which are received in the plurality of interruption slots, said central control station returning to the talk mode by generating a polling finish signal and terminating the polling or by simply terminating the polling; and (2) said plurality of terminal units operating in the following steps:

(a) talking with the central station or other terminal units by simplex or duplex operation when operating in a talk mode;

(b) changing to a polling mode in response to a receipt of a polling signal from the central control station, inhibiting talking while said system is in the polling mode, and responding from a terminal unit in response to its receiving its own polling signal;

(c) responding to a demand for talking while the system is in the polling mode by assuming a plurality of slots which are independently timed with the central station after a receipt of an interruption acceptance signal from the central control station, selecting a random one of the slots and sending an interruption signal; and (d) releasing the polling mode to the talk mode in response to the receipt of either a polling finish signal or a failure to receive a polling signal within a predetermined time interval;

whereby the talk and the data transmission by polling process are realized in the same channel.

* * * * *